July 7, 1953

H. L. SPENCE ET AL 2,644,684

CUSHIONING MECHANISM

Filed May 9, 1947

INVENTORS
Hubert L. Spence
BY Donald Willison

ATTORNEY

Patented July 7, 1953

2,644,684

UNITED STATES PATENT OFFICE 2,644,684

CUSHIONING MECHANISM

Hubert L. Spence, East Cleveland, and Donald Willison, Shaker Heights, Ohio, assignors to National Malleable and Steel Castings Company, Cleveland, Ohio, a corporation of Ohio Application May 9, 1947, Serial No. 747,014

8 Claims. (Cl. 267—9)

This invention relates to cushioning mechanism particularly adaptable for use in railway vehicles.

An object of our invention is to provide a cushioning mechanism in which resilient material such as rubber is associated with friction generating means in a novel manner.

Another object is to provide a cushioning mechanism having rubber means for cushioning shocks as well as for actuating the associated friction generating means.

A further object is to provide a cushioning mechanism in which a single block of rubber serves to cushion shocks and also simultaneously to actuate the associated friction members.

A more specific object is to provide a cushioning mechanism comprising a pair of friction members with rubber means therebetween adapted to cushion shocks and to urge the members laterally into engagement with associated friction surfaces.

A still further object is to provide a cushioning mechanism comprising relatively movable friction members having opposed sloping plane surfaces and a rubber block interposed between the surfaces adapted to cushion shocks applied to the mechanism and to urge the members into engagement with associated friction surfaces.

Other objects and advantages of our invention will be apparent from the following description of our invention taken in conjunction with the drawings in which.

Figure 1:
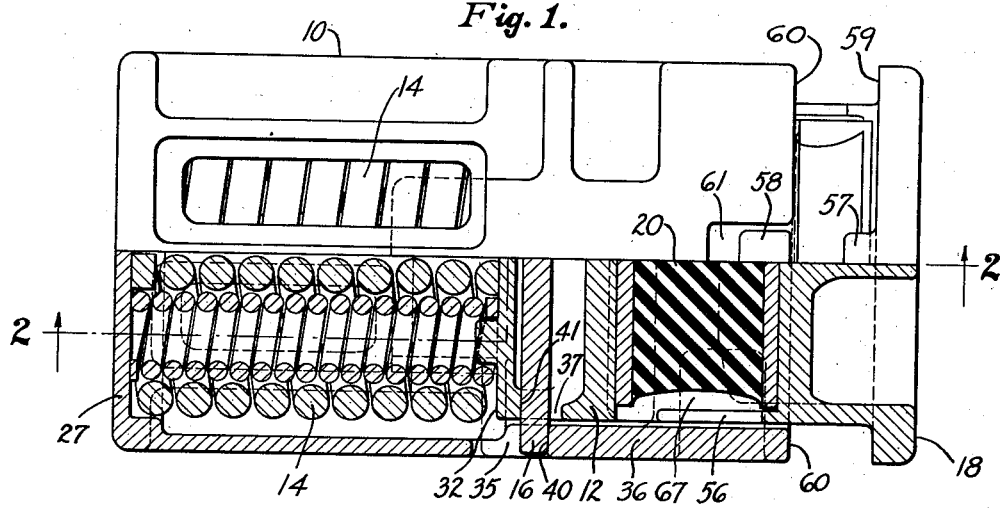
Fig. 1 is a plan view partly in longitudinal horizontal section of an embodiment of the invention.

Referring to the drawing the cushioning mechanism in its general arrangement comprises a housing member 10, a friction shoe 12 slidably engaging an inner surface of member 10, spring means 14 for opposing movement of shoe 12 lengthwise of member 10, a key 16 for retaining shoe 12 in assembled relation and for maintaining spring 14 under predetermined initial compression, a friction shoe 18 also slidably engaging an inner surface of member 10, and rubber cushion unit 20 interposed between the opposed sloping surfaces of shoes 12 and 18.

Figure 2:
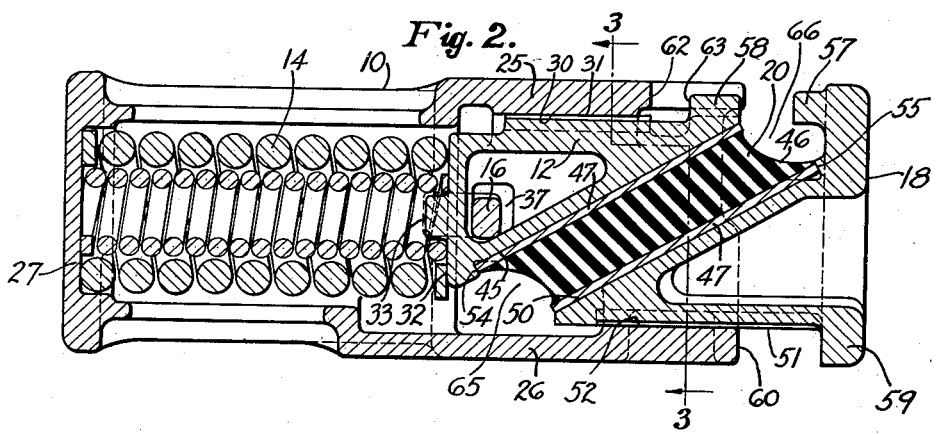
Fig. 2 is a longitudinal vertical sectional view taken along line 2—2 of Fig. 1.
Figure 3:
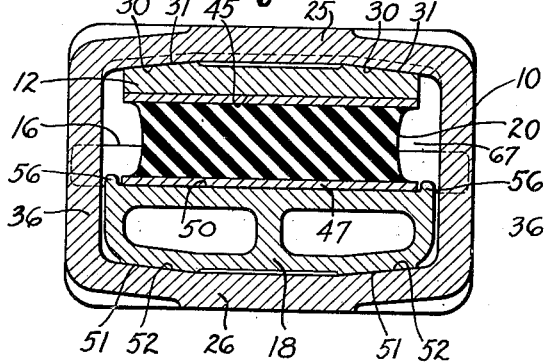
Fig. 3 is a transverse vertical sectional view taken along line 3—3 of Fig. 2.

Housing member 10 comprises top and bottom walls 25 and 26 respectively, joined by an end wall 27 which serves as an abutment for springs 14 carried within the member. Springs 14 preferably comprise two pairs of inner and outer coil springs positioned in parallel. Within member 10 and slidably engaging inner surfaces 30 of top wall 25 is wedge-shaped friction shoe 12 adapted for movement lengthwise of member 10 against the resistance of springs 14. Shoe 12 is preferably formed with angularly disposed friction surfaces 31 in engagement with surfaces 30 which are similarly disposed. Base portion 32 of the shoe engages springs 14 and is provided with a projection 33 for positioning the springs. Shoe 12 is provided with a wedge face 45 which slopes upwardly from adjacent base 32 toward the outer end of the shoe and provides a bearing surface for rubber cushion unit 20. In order that a predetermined amount of compression may be applied to springs 14, openings 35 in sidewalls 36 of the housing member, and openings 37 in shoe 12 are provided for the reception of a key 16 which engages surfaces 40 of openings 35 and surfaces 41 of openings 37. Openings 35 and 37 are so positioned that with key 16 in place as shown in Figs. 1 and 2 springs 14 are compressed a predetermined amount, the amount of such initial compression being determined by the type of cushioning action desired. This will be explained later in this specification. It will be observed also that key 16 serves to retain shoe 12 in assembled relation within housing 10.

Unit 20 preferably comprises a rubber block 46 sandwiched between a pair of plates 47 which are vulcanized or otherwise bonded to the rubber.

Friction shoe 18 which is adapted to move lengthwise of housing 10 is also wedge-shaped and has a sloping face 50 opposing face 45 of shoe 12 in engagement with plate 47 of unit 20. Shoe 18 also preferably has a pair of angularly disposed surfaces 51 which slidably engage complementary inner surfaces 52 of housing 10. It will be apparent that as shoe 18 is moved longitudinally inwardly so as to compress rubber block 46 both shoes 12 and 18 will be urged outwardly against surfaces 30 and 52 respectively. Furthermore, the rubber will be subjected to combined compression and shearing stresses as shoes 12 and 18 move relatively to one another in a longitudinal direction.

Cushion unit 20 is prevented from sliding relatively to shoes 12 and 18 upon movement inwardly of shoe 18 by shoulders 54 and 55 which engage the ends of plates 47. Units 20 are positioned laterally of the mechanism by means of upstanding flanges 56 on shoe 18.

Movement of shoe 18 in a longitudinal direction relatively to shoe 12 is limited by a stop 57 which is adapted to engage lug 58 on shoe 12 to protect rubber block 46 from being damaged by excessive compression and shear thereof. Movement of shoe 18 in a longitudinal direction relatively to housing member 10 is limited by the engagement of peripheral flange 59 with end surface 60 of housing member 10.

Top wall 25 is recessed as at 61 to receive lug 58 and allow sufficient inward movement of shoe 12 so that when shoe 18 is moved inwardly its total travel (flange 59 engaging surface 60) and with stop 57 in engagement with lug 58, a clearance will exist between surface 62 and surface 63 of lug 58. In other words the sum of the spacing between lug 58 and surface 62 on the one side thereof and stop 57 on the other side is greater than the spacing between flange 59 and surface 60 so that lug 58 cannot engage simultaneously surface 62 and stop 57.

The operational characteristics of the mechanism, as will be evident from an inspection of Figs. 1 and 2, are dependent largely upon the relative capacities of springs 14 and rubber cushion unit 20, and the service to which the mechanism will be subjected will determine the characteristics desired.

Assuming merely for purposes of illustration that it is desired to have the rubber absorb the comparatively light blows applied to the mechanism and springs 14 to cushion the heavy forces applied thereto, the rubber will, therefore, be of less capacity than the springs. The operation of the mechanism will then be as follows:

As a force is applied to the mechanism that will move shoe 18 in a lengthwise direction inwardly relatively to housing member 10 the initial action will be to subject the rubber to combined compression and shear. It will also be assumed that the initial compression exerted on springs 14 by key 16 will be such that shoe 12 will remain stationary throughout the period the rubber is being compressed. As the rubber resists the inward movement of shoe 18, both shoes 12 and 18 are urged laterally into increasing engagement with inner surfaces 30 and 52, respectively, of housing 10 and the friction generated between surfaces 51 and 52 serves to oppose further inward movement of the shoe. Movement of shoe 18 continues against the resistance of the rubber and the increasing frictional force until stop 57 engages lug 58 of shoe 12. Thereupon further working of the rubber is stopped, thus protecting it from possible damage. The engagement between stop 57 and lug 58 now causes shoe 12 to move with shoe 18 as the latter continues movement inwardly. This movement is now resisted by springs 14 and the friction produced between both shoes and the housing member and continues until flange 59 engages end surface 60.

As above described the initial compression applied to springs 14 is sufficient to preclude movement of shoe 12 until the rubber has been compressed so that stop 57 engages lug 58. This provides comparatively soft cushioning action by the rubber for absorbing light blows and shocks, while springs 14 plus the additional friction between shoe 12 and the housing member are available to cushion heavy shocks.

In the event it is desired to have the rubber unit of greater capacity than springs 14, which can be done by decreasing the capacity of the springs or increasing the rubber hardness, the cushioning action of the mechanism will be as follows:

As shoe 18 is urged inwardly of the housing, the rubber, not being under initial compression, will be compressed a slight amount until the initial compression of springs 14 has been overcome and they begin to compress. It will be observed that substantially at the start both shoes move inwardly. Compression of springs 14 in response to the movement of the shoes continues until lug 58 engages surface 62 of the housing precluding further compression of the springs and from then on the rubber and the friction between shoe 18 and the housing resist inward movement of shoe 18. Finally engagement between flange 59 and surface 60 limits further cushioning action. In this case stop 57 will not engage lug 58.

It is to be understood that while the operation of the cushioning mechanism has been described first by employing the rubber cushion to absorb light shocks and secondly having the springs 14 cushion the light shocks, it may be desirable to have the rubber cushion and springs 14 so proportioned that the operational characteristics of the device will fall somewhere between the two described above. For example, the balance between the capacity of springs 14 and the rubber may be arranged in such a manner that as shoe 18 is urged inwardly, lengthwise of housing 10, both springs 14 and the rubber will be compressed substantially simultaneously throughout the travel of the mechanism.

It will be observed that spaces 65, 66 and 67 adjacent rubber block 46 are provided to allow the rubber to flow during compression of the mechanism. Also, the sides and ends of the block have been undercut slightly to preserve the bond between the rubber and plates 47 when the rubber is compressed and to allow greater space for expansion of the rubber.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What we claim is:

1. In a cushioning mechanism, opposed wedge members arranged longitudinally of one another and adapted for relative movement in a longitudinal direction, said members having wedge surfaces extending in overlapping relationship in a direction lengthwise and crosswise of said mechanism, a rubber pad of substantial thickness interposed between said wedge surfaces and in engagement therewith for resisting said relative movement and for exerting a lateral force against said members, means associated with said members for confining said members against lateral movement during relative longitudinal movement thereof, and stops on said wedge members for engagement with said means to limit longitudinal movement of said members relative to said means.

2. In a cushioning mechanism a housing member having inner friction surfaces, a friction shoe within said member engaging one of said surfaces and being movable lengthwise of said member, spring means reacting against said housing member and said shoe for resisting said lengthwise movement of said shoe, stop means carried by said member and engaging said shoe for maintaining said spring means under initial compression, another friction shoe within said member engaging other of said friction surfaces and being movable lengthwise of said member, said shoes having opposed sloping surfaces, and a resilient pad between said opposed surfaces.

3. In a cushioning mechanism a housing member having angularly disposed inner friction surfaces, an inner friction shoe engaging part of said surfaces and being movable longitudinally of said member, spring means within said housing member for opposing longitudinal movement of said shoe, an outer friction shoe engaging other of said surfaces and being movable longitudinally of said member, said shoes having opposed wedge faces, a resilient pad of substantial thickness interposed between said faces and in engagement therewith for cushioning relative movement between said shoes and for urging said shoes laterally against said friction surfaces on said member, and means for maintaining said spring means under initial compression, said means comprising a transversely extending member extending through said inner friction shoe and received in slotted openings in said housing member.

4. In a cushioning mechanism a pair of relatively movable wedge members, one of said members being disposed forwardly of the other member, a housing member for containing said wedge members, said wedge members engaging the inner surface of said housing member and being movable longitudinally relative thereto, spring means within said housing member reacting against an end wall thereof and against the rearward one of said wedge members for opposing movement of said rearward wedge member longitudinally relative to said housing member, a resilient pad of substantial thickness interposed between said wedge members and in engagement therewith for transmitting longitudinal forces from said forward wedge member to said rearward wedge member and to urge said wedge members laterally against said housing member.

5. In a cushioning mechanism a housing member, a wedge member within said housing member and in longitudinal slidable engagement therewith, spring means within said housing member for opposing movement of said wedge member relative to said housing member, a follower wedge member within said housing member and in slidable engagement therewith, said follower wedge member being in longitudinally spaced opposed relation to said first named wedge member, and a resilient pad interposed between said wedge members for opposing movement of said follower wedge member longitudinally toward said first named wedge member and for urging said wedge members laterally against said housing member.

6. In a cushioning mechanism a housing member, a friction shoe engaging said member and being movable lengthwise thereof, spring means carried by said housing member for opposing said lengthwise movement of said shoe, said shoe having a diagonally disposed surface, another friction shoe engaging said housing member and movable lengthwise thereof, said last named shoe having a diagonally disposed surface parallel to and facing said surface on said first named shoe, a resilient pad of substantial thickness between said diagonal surfaces on said shoes adapted to cushion relative movement therebetween and to urge said shoes laterally against said housing member.

7. In a cushioning mechanism a housing member, a friction shoe within said member and engaging the inner surface thereof, said shoe being movable lengthwise of said member, spring means carried by said member for opposing movement of said shoe lengthwise of said member, an outer friction shoe extending into said member and engaging the inner surface thereof, said outer shoe being movable lengthwise of said member, said shoes having opposed parallel sloping surfaces, and a resilient pad of substantial thickness interposed between said sloping surfaces and being subjected to combined compression and shearing stresses upon inward movement of said outer shoe relative to said member.

8. In a cushioning mechanism a housing member, forward and rearward wedge members in said housing member, said wedge members engaging the inner surface of said housing member and being movable in a direction longitudinally thereof, spring means carried by said housing member for opposing said longitudinal movement of the wedge members, said wedge members having opposed sloping surfaces, a resilient pad between said sloping surfaces and in engagement therewith for opposing movement of said forward wedge member toward said rearward wedge member and for urging the wedge members laterally against said housing member, and stop means on said forward wedge member for engaging said rearward wedge member to limit movement of said forward wedge member toward said rearward wedge member.

HUBERT L. SPENCE.
DONALD WILLISON.

References Cited in the file of this patent

UNITED STATES PATENTS

| Number | Name | Date |
| --- | --- | --- |
| 736,724 | Handiges | Aug. 18, 1903 |
| 754,594 | McKeen | Mar. 15, 1904 |
| 754,679 | Moore | Mar. 15, 1904 |
| 815,049 | Tower | Mar. 13, 1906 |
| 1,008,670 | O'Connor | Nov. 14, 1911 |
| 1,255,214 | O'Connor | Feb. 5, 1918 |
| 1,884,520 | Barrows | Oct. 25, 1932 |
| 2,141,680 | Barrows | Dec. 27, 1938 |
| 2,211,463 | Hobson | Aug. 13, 1940 |
| 2,216,231 | Dentler | Oct. 1, 1940 |
| 2,286,861 | Light | June 16, 1942 |
| 2,306,398 | Light | Dec. 29, 1942 |
| 2,352,030 | Sproul | June 20, 1944 |
| 2,381,404 | Cottrell | Aug. 7, 1945 |